June 23, 1936.  A. LÉTREUX  2,045,193

AUTOMATIC GRAIN METER

Filed July 27, 1935   2 Sheets-Sheet 1

A. Létreux
INVENTOR

By: Glascock Downing & Seebold
Attys.

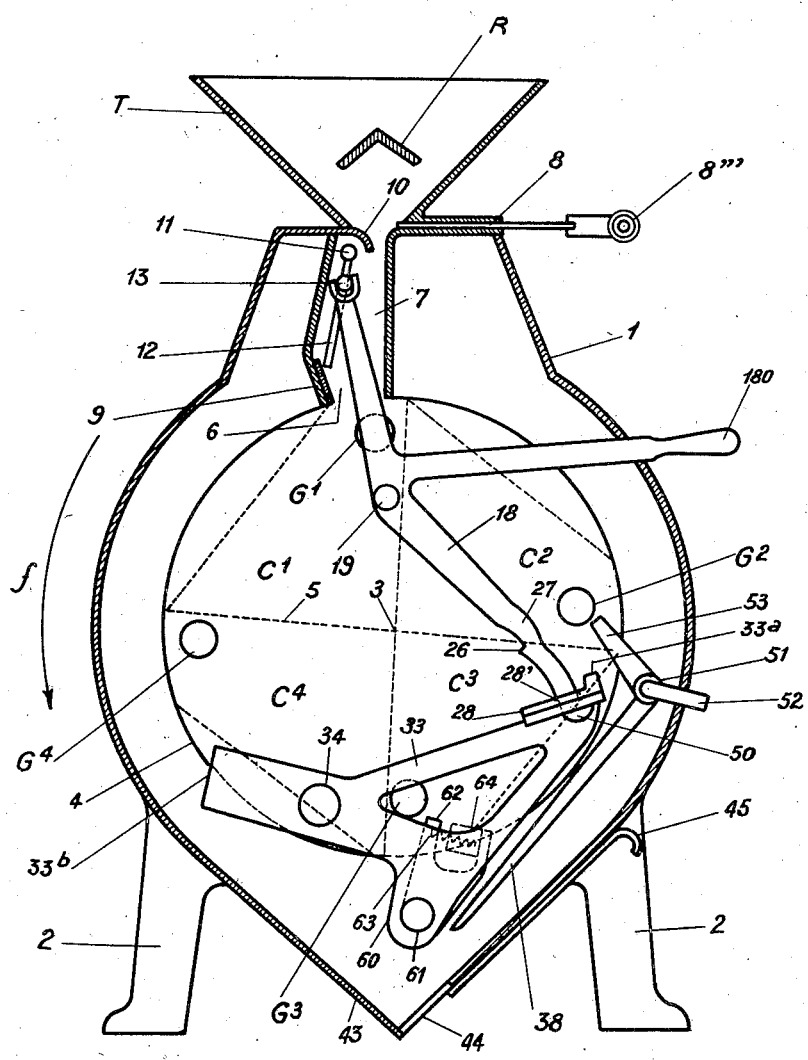

Patented June 23, 1936

2,045,193

UNITED STATES PATENT OFFICE 2,045,193

AUTOMATIC GRAIN METER

Albert Létreux, Constantine, Algiers

Application July 27, 1935, Serial No. 33,591
In France July 31, 1934

12 Claims. (Cl. 73—217)

This invention has reference to grain meters and has for its object to provide a meter of this class of entirely automatic operation, capable of volumetrically measuring with accuracy and rapidity any quantities of grains such as grains of cereals or other granular or like substances regardless of their specific gravity and also capable of actuating known recording means for indicating the number of volume units thus measured by an easy reading.

Another object of the invention is to provide an automatic grain meter, the operation of which is continuous and requires no supervision, the measurement of the grain by such meter taking place uninterruptedly between an inlet feeding hopper and an outlet discharge bin by a cyclic operation comprising simultaneous filling and emptying of different buckets comprised in a system of co-related buckets pivotally mounted bodily for step-by-step rotation on a common shaft.

Still another object of the invention is to provide an automatic grain meter wherein proper operation and accurate measurement of the grains by the successive buckets are responsive to the proper ingress of the grain into the bucket being filled and to the proper and full egress of the grain out of the bucket being emptied, whereby any disturbance in the ingress or the egress of the grain automatically stops the operation of the meter at once and precludes any inaccurate or false measurement.

A further object of the invention is to provide an automatic grain meter wherein the shocks or jerks due to the repeated stoppages of the bucket system by reason of its step-by-step rotation are reduced by shock-absorbing means carried by a rockable beam adapted to permit said rotation to take place timely responsive to the weight exerted by the successive buckets, from their filling to their emptying positions.

A still further object of the invention is to provide an automatic grain meter of simple construction, light weight, small overall volume and reliable operation requiring no labor to watch over it while it functions, adapted to ensure correct measurement in all locations and not liable to be disturbed by dirt such as dust which unavoidably is present in grains in bulk such as corn.

Still a further object of the invention is to provide an automatic grain meter possessing the aforesaid advantages and having a rugged and self-contained structure while being cheap to manufacture and assemble.

With these and such other objects in view as will incidentally appear hereafter, the invention consists in the features of construction that will be hereafter specified with reference to the accompanying diagrammatic drawings forming a part of the present disclosure and that will be particularly pointed out in the claims.

In the drawings:

Figure 2 is a view similar to Figure 1, showing the meter with the stopping means in bucket-freeing position, assuming the grain (not shown) fed through the inlet hopper to have actuated the tripping means in the hopper to permit rotation of the system of buckets.

Like reference characters designate like parts throughout the several views.

Figure 1:
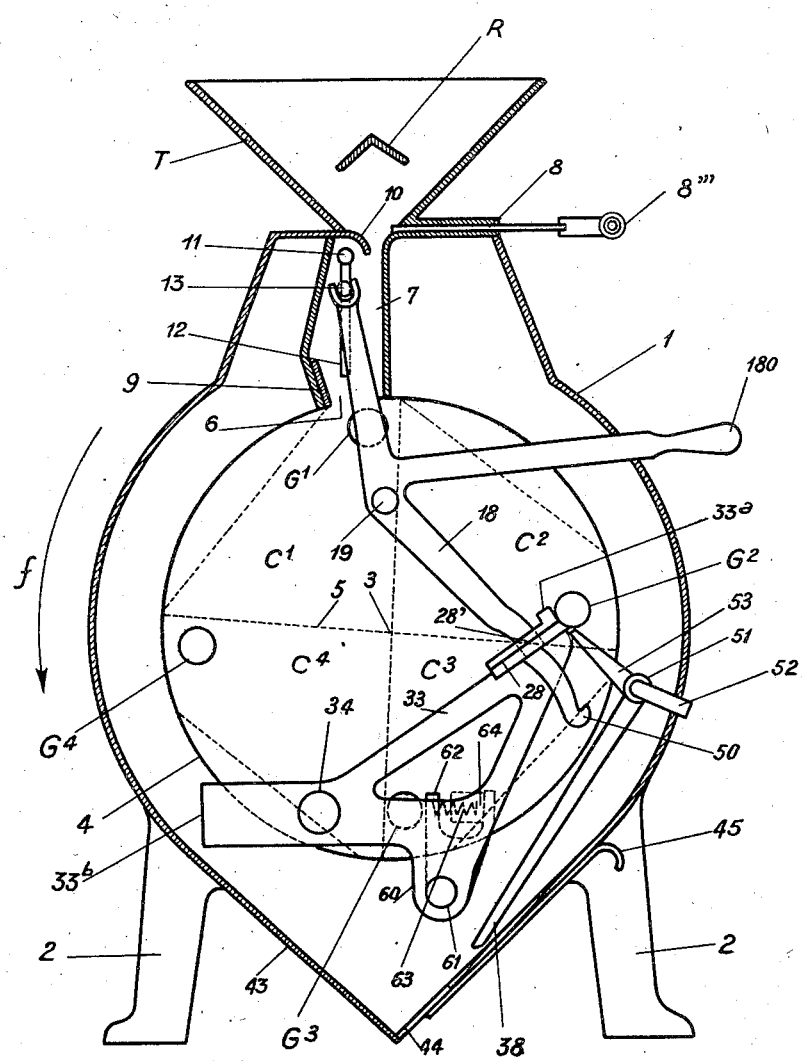
Figure 1 is an elevational view, partly in section, of the automatic grain meter, assuming the automatic stopping means located in the discharge bin to occupy a position preventing rotation of the system of buckets.

As illustrated, the apparatus comprises an upstanding frame I supported by legs 2 and provided in a more or less central position with a shaft 3. On this shaft can rotate a system of buckets which are so integrally united bodily as to constitute a measuring drum 4. In the embodiment illustrated, the drum 4 is divided by radial partitions such as 5 into four equally sized and symmetrically disposed compartments or buckets $C^1$, $C^2$, $C^3$, $C^4$.

The four buckets of the drum 4 have exactly the same capacity, and each of them communicates with the exterior only through an opening 6 constituted by a segment of the circular periphery of the drum. The size of each opening 6 is substantially equal to the outer size of the well defining internally the lower outlet of a hopper or chute 7 secured to the top of the frame I. The hopper 7 is vertically offset relative to the shaft 3 of the drum 4, so as to permit the step-by-step rotation of the drum under gravitational stresses, in the direction shown by the arrow $f$, as will presently appear. Above the hopper 7 may be disposed a grain feeding trough T fitted internally with an angular distributor R of known form.

One side face of the drum 4 carries four spaced cams $G^1$, $G^2$, $G^3$, $G^4$ constituted by suitable projections and located adjacent the openings 6 of the respective buckets.

The respective sizes of the drum 4 and hopper 7 are such that, in four equidistant angular positions of the drum, the outline of the lower outlet of the hopper 7 and the outline of the opening 6 of the bucket located thereunder at the same moment register. Moreover, the hopper 7 is so sized and disposed that the circular periphery of the bucketed drum 4 contacts slidably with the edges of its lower outlet.

The right hand side wall of the hopper 7 (see Fig. 1) has a top slot through which a manually actuated shutter 8 provided with a handle 8''' can be shifted for closing or opening at will the top end of the hopper. The left hand side wall of the hopper 7 advantageously has the angular profile as shown. It is provided adjacent its lower end with a scraper 9. A downwardly bent cover shield 10 throttles the top end of the hopper 7 on a part of its cross sectional area.

Under the shield 10 is a horizontal pivot pin 11 to which is suspended a board 12 (hereafter called the "tripping board") capable of rocking from the position shown in Figure 1 to the position shown in Figure 2. The shield 10 overhangs the tripping board 12, as shown, for a purpose that will appear hereafter.

To the tripping board 12 is connected by a pivotal joint 13 the upper forked end of a cranked lever 18 the fulcrum of which is constituted by a pin 19 secured to the adjacent part of the frame 1. The lever 18 has a side arm 180 which permits to move it manually when required.

One edge of the lower part of the lever 18 has a notch 26 while its opposite edge has a boss 27 located slightly above said notch. The free lower end of the lever 18 is formed as a hook 50. Said lever is constantly engaged through a slot 28' formed in a lock plate 28 secured to a rocking beam 33 pivotally carried by a pin 34 secured to the adjacent part of the frame 1. The hook 50 is adapted to abut and stop the outermost edge of the slot 28' when the beam 33 rocks down (as shown in Fig. 2) and therefore to limit the downward rocking motion of said beam.

The outermost edge of the beam 33 is provided with a transverse yoke 33a extending in the path of circular travel of the cams $G^1$, $G^2$, $G^3$, $G^4$ so as to form an abutment surface for said cams, successively, as will presently appear.

The rear end of the rocking beam 33 is counterweighted at $33^b$. A depending lug 60 formed integral with the lower edge of the beam 33 carries a pin 61 on which is pivotally mounted a forked abutment 62 of such a size that its upper end is situated in the path of circular travel of the cams $G^1$ to $G^4$, in the position shown in Figure 1. One leg of the forked abutment 62 has a recess receiving the one end of a coil spring 63 the opposite end of which is received in a recess in a block 64 rigidly secured to the beam 33, so that the forked abutment 62 cannot be swung clockwise by the impact of the bucket cams without compressing the spring 63. Therefore said impact is absorbed by the spring 63, and the shocks or jerks are lessened.

Under the drum 4, the frame 1 carries a discharge bin 43 having a side outlet 44 through which the grain can flow away towards any receptacle (not shown) after having passed through the drum. The sectional area of the outlet 44 can be modified at will by means of a sliding damper 45 which can be shifted manually.

Inside the bin 43 there is provided a downwardly inclined plate 38 mounted for pivotal motion about a pin 51 carried by the frame 1 and fitted at its upper end, adjacent the pin 51, with a counterweight 52 on the one side and with a latch 53 on the opposite side. The size of the latch 53 is such that when the plate 38 occupies the position shown in Figure 1, said latch engages the outermost edge of the beam 33 and prevents the latter from rocking down.

The plate 38 is adapted to be moved from its beam-freeing position (shown in Figure 2) to its beam-locking position (shown in Figure 1) by the action of the grain heaping up in the bin 43. This may happen if, somehow, the bin outlet 44 is unduly throttled by the damper 45 or otherwise clogged. This is illustrated in Figure 1 wherein, however, the mass of grain heaping in the bin 43 has not been shown, for the sake of clearer illustration.

It will be understood that if the grain, poured into the bin 43 by the buckets that empty themselves one after the other, cannot flow away through the outlet 44 with enough rapidity, the grain heaps in the bin. This involves the danger that, when the level of said heaping grain reaches the bottom of the drum 4, the buckets can no longer fully empty themselves of their contents, which would render measurements inaccurate.

Such a risk is entirely eliminated by the provision of the latch-carrying plate 38 arranged in the bin 43 as shown. The pressure of the grain heaping in the bin 43 pushes the plate 38 anti-clockwise, which brings its latch 53 into engagement with the beam 33. This prevents said beam from rocking down and at once stops the apparatus. As soon, however, as the grain has flown out of the bin 43, the plate 38 resumes its normal position (as shown in Figure 2) under the action of its counterweight 52. This frees the beam 33 from the latch 53 and permits the automatic operation of the apparatus to be resumed under gravitational action.

The operation of the apparatus is as follows:

The grain to be measured volumetrically flows through the feeding trough T and hopper 7 into the bucket $C^1$, said incoming grain being guided off the tripping board 12 by the overhanging shield 10. During the bucket-filling operation, the drum 4 is held against rotation in the direction shown by the arrow $f$ by the fact that its cam $G^3$ abuts the fork 62 on the beam 33 and the latter is simultaneously prevented from rocking down by the interlocking of the lever notch 26 and slot 28' in the female lock plate 28. As soon as the bucket $C^1$ is full of grain, the grain heaps in the hopper 7 and swings the tripping board 12 clockwise about its pin 11. This causes an anti-clockwise pivotal motion of the lever 18 whose notch 26 is moved off the slot 28' in the female lock plate 28. Assuming the plate 38 to be then in beam-freeing position, the beam 33 is thus permitted to rock down from the position shown in Figure 1 to the position shown in Figure 2. This frees the drum 4, whereby under the gravitational action due to the weight of the non-balanced bucket $C^1$ which is full of grain, said bucket comes to the position previously occupied by the bucket $C^4$. Any leakage of grain is prevented by the scraper 9. Discharge of the bucket $C^1$ begins while, under the action of the cam $G^3$ on the yoke 33a of the beam 33, the latter is rocked up. The outermost edge of the slot 28' of the lock plate 28 then engages the boss 27 on the lever 18 and brings the latter, by a clockwise motion, back to its position as shown in Figure 1. Simultaneously the tripping board 12 is brought back to its original position and the operation of the apparatus can be continued. The opening 6 of the bucket $C^2$ then registers with the outlet of the hopper 7. Upon the next tripping action of the board 12, the bucket $C^2$ which is then full of grain moves to discharging position, and the discharge of the bucket C¹ is completed as the latter then occupies the position occupied by bucket C³ in Figure 1.

As will be seen, the drum 4 rotates step-by-step, the mouth of each bucket coming in turn into registration with the lower outlet of the hopper 7. Therefore, the operation takes place continuously and automatically without requiring labor.

The engagement of each cam successively with the beam 33 is absorbed, as above-stated, by the elastic buffer constituted by the pivotal assembly designated by 62, 63, 64.

As above-stated, should the grain fail to flow off the bin 43 with enough rapidity, the plate 38 is moved angularly and, through the medium of its latch 53, holds the beam 33 and stops the apparatus at once.

In other words, proper operation of the apparatus can only take place responsive to proper ingress of the grain through the hopper 7 and proper egress of the grain from the discharge bin 43. If, somehow, the ingress or egress of the grain is interfered with, there is no risk of false measurement since the apparatus stops automatically.

The size of the buckets may vary of course to cope with variable quantities of grain to be measured. The number of revolutions effected by the drum 4 may be registered in any conventional way forming no part of the invention. The quantity of grain measured can thus be calculated in a very simple way from the number of revolutions of the drum, for example by any known form of revolution recorder mounted upon its shaft 3.

The constructional details may vary of course without departing from the scope of the subjoined claims.

What is claimed is:

1. A grain meter comprising a frame, a system of equal buckets rotatable about a shaft in the frame and each having a cam, a feed hopper surmounting said system and under which the buckets successively pass, a trip in the hopper, a beam pivotable gravitationally about a fixed point on the frame and having abutments across the path of the cams, a pivotable lever connected to the trip and capable of locking or unlocking the beam, and associated means on the beam and lever whereby each of these two members is moved pivotally responsive to the angular position assumed by the other, said lever pivoting to beam-unlocking position due to the motion of the trip when the grain rises in the hopper after filling of the underlying bucket so as to permit rocking down of the beam off one of the cams and partial rotation of the system until rocking up of the beam by the next cam has pivoted the lever back to beam-locking position.

2. A grain meter comprising a frame, a system of equal buckets rotatable about a shaft in the frame and each having a cam, a feed hopper surmounting said system and under which the buckets successively pass, a discharge bin under said system, a trip in the hopper, a counterweighted beam rockable about a fixed point on the frame and having abutments across the path of the cams, a pivotable lever connected to the trip and capable of locking or unlocking the beam, associated means on the beam and lever whereby each of these two members is pivoted responsive to the angular position of the other, said lever pivoting to beam-unlocking position due to the motion of the trip when the grain rises in the hopper after filling of the underlying bucket so as to permit rocking down of the beam off one of the cams and partial rotation of the system until rocking up of the beam by the next cam has pivoted the lever back to beam-locking position, and a latch engageable with the beam responsive to heaping of the grain in the discharge bin.

3. A grain meter comprising a frame, a system of equal buckets rotatable about a shaft in the frame and each having a cam, a feed hopper closely surmounting said system and under which the buckets successively pass, said hopper being vertically offset to said shaft, a discharge bin under said system, a trip pivotally suspended in the hopper, a counterweighted beam rockable about a fixed point on the frame and having a pair of abutments across the path of the cams, one of said abutments being elastic, a pivotable lever connected to the trip and capable of locking or unlocking the beam, associated means on the beam and lever whereby each of these two members is pivoted responsive to the angular position of the other, said lever pivoting to beam-unlocking position due to the motion of the trip when the grain rises in the hopper after filling of the underlying bucket so as to permit rocking down of the beam off one of the cams and partial rotation of the system until rocking up of the beam by the next cam has pivoted the lever to beam-locking position, and a latch engageable with the beam responsive to heaping of the grain in the discharge bin.

4. A grain meter comprising a frame, a system of equal buckets rotatable about a shaft in the frame and each having a cam, a feed hopper closely surmounting said system and under which the buckets successively pass so that said hopper registers with the mouth of each bucket in succession, said hopper being vertically offset to said shaft, a trip depending in the hopper, a counterweighted beam rockable about a fixed point on the frame and having abutments across the path of the cams, a pivotable lever connected to the trip and capable of locking or unlocking the beam, and associated means on the beam and lever whereby each of these two members is pivoted responsive to the angular position of the other, said lever pivoting to beam-unlocking position due to the motion of the trip when the grain rises in the hopper after filling of the underlying bucket to permit rocking down of the beam off one of the cams and partial rotation of the system until the rocking up of the beam by the next cam has pivoted the lever back to beam-locking position.

5. A grain meter comprising a frame, a system of equal buckets rotatable about a shaft in the frame and each having a cam, a feed hopper closely surmounting said system and under which the buckets successively pass, a trip pivotally suspended in the hopper, a shield overhanging the trip, a counterweighted beam rockable about a fixed point on the frame and having abutments across the path of the cams, one of the abutments being elastic, a pivotable lever connected to the trip and capable of locking or unlocking the beam, and associated means on the beam and lever whereby each of these two members is moved pivotally responsive to the angular position assumed by the other, said lever pivoting to beam-unlocking position due to the motion of the trip when the grain rises in the hopper after filling of the underlying bucket so as to permit rocking down of the beam off one of the cams and partial rotation of the system until rocking up of the beam by the next cam has pivoted the lever back to beam-locking position.

6. A grain meter comprising a frame, a system of equal buckets rotatable about a shaft in the frame and each having a cam, a feed hopper closely surmounting said system and under which the buckets successively pass so that said hopper registers with the mouth of each bucket in succession, said hopper being vertically offset to said shaft, a discharge bin under said system, a trip pivotally suspended in the hopper, a shield overhanging the trip, a counterweighted beam rockable about a fixed point on the frame and having abutments across the path of the cams, a pivotable lever connected to the trip and capable of locking or unlocking the beam, associated male and female inter-engaging means on the lever and beam whereby each of these two members is moved pivotally responsive to the angular position assumed by the other, said lever pivoting to beam-unlocking position due to the motion of the trip when the grain rises in the hopper after filling of the underlying bucket so as to permit rocking down of the beam off one of the cams and partial rotation of the system until rocking up of the beam by the next cam has pivoted the lever back to beam-locking position, and a latch engageable with the beam responsive to heaping of the grains in the discharge bin.

7. A grain meter comprising a frame, a drum rotatable about a shaft in the frame, said drum being divided into equal buckets disposed radially of said shaft and each having a cam, a feed hopper so surmounting the drum that the buckets successively pass under the hopper, the shaft and hopper being vertically offset, a tripping board pivotally suspended in the hopper, a counterweighted beam rockably carried by a fixed point on the frame and having abutments across the path of the cams, a pivotable lever connected to the tripping board and capable of locking or unlocking the beam, and associated means on the beam and lever whereby each of these two elements is moved pivotally responsive to the angular position assumed by the other, said lever pivoting to beam-unlocking position due to the motion of the trip when the grain rises in the hopper after filling of the underlying bucket so as to permit rocking down of the beam off one of the cams and partial rotation of the drum until rocking up of the beam by the next cam has pivoted the lever back to beam-locking position.

8. A grain meter comprising a frame, a drum rotatable about a shaft in the frame, said drum being divided into equal buckets disposed radially of said shaft and each having a cam, a feed hopper surmounting the drum and under which the buckets successively pass, a discharge bin under the drum, a tripping board pivotally suspended in the hopper, a counterweighted beam rockably carried by a fixed point on the frame and having spaced abutments across the path of the cams, one of said abutments being elastic, a pivotable lever connected to the tripping board and capable of locking or unlocking the beam, associated inter-engaging means on the beam and lever whereby each of these two elements is moved pivotally responsive to the angular position assumed by the other, said lever pivoting to beam-unlocking position due to the motion of the tripping board when the grain rises in the hopper after filling of the underlying bucket so as to permit rocking down of the beam off one of the cams and partial rotation of the drum until rocking up of the beam by the next cam has pivoted the lever back to beam-locking position, and a latch carried by a plate in the bin and engageable with the beam responsive to heaping of the grains in said bin and pressure on said plate.

9. A grain meter comprising a frame, a bucketed drum rotatable in the frame, a circumferential row of cams on one side of the drum in number equal to the buckets, a hopper located above the drum and under which the buckets successively pass, a bin under the drum, a trip in the hopper, a counterweighted beam rockably carried by a fixed point on the frame and having a pair of abutments across the cam path, one of said abutments being elastic, a pivotable lever fulcrumed on the frame and connected to the trip, said lever being capable of locking or unlocking the beam, co-operating means on the beam and lever whereby each of these two elements is moved pivotally responsive to the angular position assumed by the other, said lever being swung to beam-unlocking position by the trip when the grain rises in the hopper after filling of the underlying bucket to permit rocking down of the beam off one of the cams and partial rotation of the drum until rocking up of the beam by the next cam has swung the lever back to beam-locking position, and a latch carried by movable means in the bin and engageable with the beam responsive to a pressure of the grains heaping in said bin on said movable means.

10. A grain meter comprising a frame, a bucketed drum rotatable in the frame, a circumferential row of cams on one side of the drum in number equal to the buckets, a hopper located above the drum and under which the buckets successively pass, a bin under the drum, a trip pivotally suspended in the hopper, a shield overhanging the trip, a slotted beam rockable gravitationally about a fixed point on the frame and having a pair of abutments across the cam path, a pivotable lever fulcrumed on the frame and connected to the trip, said lever engaging through the beam slot and being capable of locking or unlocking the beam depending on its angular position, co-operating means on the beam and lever whereby each of these two elements is moved pivotally responsive to the angular position assumed by the other, said lever being swung to beam-unlocking position by the trip when the grain rises in the hopper after filling of the underlying bucket so as to permit rocking down of the beam off one of the cams and partial rotation of the drum until rocking up of the beam by the next cam has swung the lever back to beam-locking position, and a latch carried by a plate in the bin and engageable with the beam responsive to heaping of the grains in said bin and pressure on said plate.

11. A grain meter comprising a frame, a drum rotatable about a shaft in the frame, said drum being divided into equal radial buckets each having a cam projecting from one side of the drum, a hopper located above the drum and under which the buckets successively pass, a bin under the drum, a trip pivotally suspended in the hopper, a shield overhanging the trip, a slotted beam gravitationally rockable about a fixed point on the frame and having a pair of spaced abutments across the cam path, one of said abutments being formed by a pivotally mounted and spring-urged fork, a pivotable lever fulcrumed on the frame and connected to the trip, said lever engaging through the beam slot and being so shaped as to lock or unlock the beam depending on its angular position, co-operating male and female means on the lever and beam whereby each of these two elements is moved pivotally responsive to the angular position assumed by the other, said lever being swung to beam-unlocking position by the trip when the grain rises in the hopper after filling of the underlying bucket so as to permit rocking down of the beam off one of the cams and partial rotation of the drum until rocking up of the beam by the next cam has swung the lever back to beam-locking position, and a latch carried by a counterweighted plate pivotally carried in the bin and engageable with the beam responsive to heaping of the grains in said bin and pivoting of said plate.

12. A grain meter comprising a frame, a bucketed drum rotatable in the frame, a circular row of cams projecting from one side of the drum in number equal to the buckets, a hopper located above the drum and under which the buckets successively pass, a bin under the drum, a trip pivotally depending in the hopper, a beam rockable about a fixed point on the frame and having a slotted lock plate and a pair of spaced abutments across the cam path, one of said abutments being elastic, a trip-actuated pivotable lever having a hooked end engaging through said slotted plate, said lever having a notch and a boss on its opposite edges, said notch co-operating with one edge of the slotted plate for locking or unlocking the beam depending on the angular position of the lever while the boss co-operates with the opposite edge, said lever being swung to beam-unlocking position by the trip when the grain rises in the hopper after filling of the underlying bucket to permit rocking down of the beam off one of the cams and partial rotation of the drum until rocking up of the beam by the next cam has engaged the lever boss and swung the lever back to beam-locking position, and a latch carried by a plate in the bin and engageable with the beam responsive to a pressure of the grains in the bin on said plate.

ALBERT LÉTREUX.